(12) United States Patent
Bowen et al.

(10) Patent No.: US 8,776,629 B2
(45) Date of Patent: Jul. 15, 2014

(54) DUAL CLUTCH TRANSMISSION AND DUAL CLUTCH ACTUATORS THEREOF

(71) Applicant: Hyundai Wia Corporation, Changwon-shi (KR)

(72) Inventors: Thomas Bowen, Rochester Hills, MI (US); Nam Huh, Commerce Township, MI (US)

(73) Assignee: Hyundai Wia Corporation (KR)

( * ) Notice: Subject to any disclaimer, the term of this patent is extended or adjusted under 35 U.S.C. 154(b) by 0 days.

(21) Appl. No.: 13/799,269

(22) Filed: Mar. 13, 2013

(65) Prior Publication Data

US 2013/0192398 A1 Aug. 1, 2013

Related U.S. Application Data

(62) Division of application No. 12/903,617, filed on Oct. 13, 2010.

(51) Int. Cl.
*F16H 3/04* (2006.01)

(52) U.S. Cl.
USPC .......................................... 74/330; 192/99 A (58) Field of Classification Search
USPC ........ 74/337.5, 329, 330, 331, 335, 340, 358, 74/360; 192/48.4, 48.9, 93 B, 48.8, 48.2, 192/70.29, 99 A, 48.606, 48.6, 70.3, 48.601
See application file for complete search history.

(56) References Cited

U.S. PATENT DOCUMENTS

| | | | | |
|---|---|---|---|---|
| 4,787,492 A * | 11/1988 | Ball et al. | ...................... | 192/48.8 |
| 5,915,512 A * | 6/1999 | Adamis et al. | ............... | 192/3.61 |
| 5,950,781 A * | 9/1999 | Adamis et al. | ............... | 192/3.61 |
| 6,012,561 A * | 1/2000 | Reed et al. | .................... | 192/48.2 |
| 7,007,783 B2 * | 3/2006 | Gerathewohl et al. | ........ | 192/70.2 |
| 7,127,961 B2 * | 10/2006 | Braford et al. | ................... | 74/340 |
| 7,311,015 B2 * | 12/2007 | Kluge | ......................... | 74/337.5 |
| 7,426,880 B2 * | 9/2008 | Caenazzo et al. | ............... | 74/330 |
| 7,428,852 B2 * | 9/2008 | Baldwin et al. | .............. | 74/337.5 |
| 7,448,291 B2 * | 11/2008 | Stengel et al. | ................. | 74/335 |
| 7,467,564 B2 * | 12/2008 | Baldwin et al. | .............. | 74/337.5 |
| 7,520,963 B2 * | 4/2009 | Honkanen et al. | ............ | 162/355 |
| 7,779,712 B2 * | 8/2010 | Mesiti et al. | ..................... | 74/330 |
| 7,895,910 B2 * | 3/2011 | Caenazzo et al. | ............... | 74/331 |
| 8,028,600 B2 * | 10/2011 | Kim et al. | ..................... | 74/473.1 |
| 8,055,415 B2 * | 11/2011 | Belmont et al. | ................ | 701/53 |

(Continued)

*Primary Examiner* — Troy Chambers
*Assistant Examiner* — Zakaria Elahmadi
(74) *Attorney, Agent, or Firm* — Park & Associates IP Law, P.C.

(57) ABSTRACT

A dual clutch apparatus for a dual clutch transmission having a first input shaft and a second input shaft includes: a first clutch of generally annular shape; a second clutch of generally annular shape disposed coaxially with the first clutch; and, a plurality of first and second clutch levers received in a clutch retaining housing in a circularly arranged pattern with the first clutch levers alternately interleaved with the second clutch levers; in which the first clutch includes a clutch finger plate of generally annular shape, the clutch finger plate having a plurality of fingers extending in the axial direction of the first clutch and through an outer circumference of the second clutch and configured to push a first clutch application plate of generally annular shape which is coupled with the first clutch levers for clutch application of the first clutch, and a friction plate arranged next to the first clutch application plate and coupled with a hub of the first clutch, the hub of the first clutch coupled with the first input shaft.

4 Claims, 8 Drawing Sheets

(56) References Cited

U.S. PATENT DOCUMENTS

| | | | |
|---|---|---|---|
| 2004/0224818 A1* | 11/2004 | Leising et al. | 477/77 |
| 2009/0084209 A1* | 4/2009 | Tsukada et al. | 74/330 |
| 2009/0107279 A1* | 4/2009 | Garabello et al. | 74/473.37 |
| 2010/0199792 A1* | 8/2010 | Werner et al. | 74/330 |
| 2010/0212440 A1* | 8/2010 | Thery | 74/330 |
| 2010/0251840 A1* | 10/2010 | Mohlin et al. | 74/330 |
| 2010/0294058 A1* | 11/2010 | Singh et al. | 74/330 |
| 2010/0294059 A1* | 11/2010 | Singh et al. | 74/330 |
| 2010/0319473 A1* | 12/2010 | Singh et al. | 74/331 |

* cited by examiner

DUAL CLUTCH TRANSMISSION AND DUAL CLUTCH ACTUATORS THEREOF

REFERENCE TO RELATED APPLICATIONS

This is a divisional of pending U.S. patent application Ser. No. 12/903,617 filed on Oct. 13, 2010, the entire contents of which are incorporated herein by reference.

FIELD OF THE INVENTION

The present invention relates to a dual clutch transmission which is operatively coupled with multiple gears for a vehicle, and also to a dual clutch apparatus and a clutch actuation apparatus for the dual clutch transmission.

BACKGROUND AND SUMMARY OF THE INVENTION

A conventional manual shift transmission contains one clutch that is normally closed, or applied, by a spring. It is manually disengaged by the driver to shift gears. With a conventional manual transmission, operating the clutch and shifting the gears must be performed in sequence. To shift gears, the driver reduces the engine throttle, and pushes the clutch pedal to release the clutch. With the clutch released, the driver manually shifts to another gear, and then reapplies the clutch and throttle.

A dual clutch transmission of a vehicle typically utilizes two manual shift transmissions in a single housing to drive the wheels of a vehicle with different gear ratios or stages. A conventional dual clutch transmission generally contains two independent clutches that are normally open or released, and further includes at least one input shaft, and at least one output shaft operatively coupled with each other. Each of the two clutches is coupled to its corresponding input shaft to drive an output shaft with a selected gear ratio among multiple gears. In order to perform the gear shifting process, the dual clutch transmission typically also includes a gear shift actuating device which is driven by one or more actuators.

For example, the present invention (as will be described below in detail) discloses a dual clutch transmission having two independent clutches coupled with multiple gears, namely, six forward gears and one reverse gear in the exemplary embodiment disclosed. According to this embodiment, a first clutch (to be referred below either a first clutch or "A" clutch) drives the odd numbered gears, namely, the first, third, and fifth gears, and a second clutch (to be referred below either a second clutch or "B" clutch) drives the even numbered gears, namely, the second, fourth, and sixth gears, plus the reverse gear.

With a dual clutch transmission, operating the clutches is separated from shifting the gears. The normally open clutches of the dual clutch transmission allow "pre-selecting" which is the ability to engage one gear while another gear is driving. Pre-selecting provides a very fast shift because there is no time lost by releasing the clutch, shifting to the next gear, and then applying the clutch as in the manual shift transmissions.

For example, when starting the vehicle, the transmission is in the first gear with the first clutch ("A" clutch) applied, and the second clutch ("B" clutch) released. To shift into the second gear, the shifter pre-selects the second gear, which is idle. The "A" clutch is then released, and the "B" clutch is applied. This clutch to clutch shift takes place in about 0.5 second. First gear is then disengaged.

To continue the sequence and shift to the third gear, the third gear is pre-selected. Then the "B" clutch is released, and the "A" clutch is applied. The second gear is then disengaged. This shifting sequence proceeds, automatically, up to the sixth gear.

The clutches are alternately applied and released by electro-mechanical actuators that are controlled by an on-board computer. If the clutch and actuator systems are properly designed, the shifts of the dual clutch transmission simulate the smooth shift of an automatic transmission.

In order to accurately control the application and release of the two clutches, they must be free to operate independently. Any interference between the two clutches could result in unpredictable operation. In addition, the normally open dual clutches will 'fail safe". When the engine is shut off, or if electrical power is lost, the low friction of the actuators allow the internal clutch springs to release the clutches automatically.

Smooth shifts in a conventional manual transmission are a function of the driver's skill in operating the clutch. If the clutch is applied too quickly, the shift will be harsh, and may stall the engine at low speeds. If the shift is too slow, vehicle acceleration and clutch life will be degraded.

The shifts with the dual clutch transmission are independent of operator skill, similar to an automatic transmission. The computer applies one clutch while releasing the other. If one clutch applies before the other releases, the engine must drive two gears at once, which reduces acceleration. This is called overlap. If both clutches are released at the same time, the engine speed will suddenly increase, or flare.

Conventional dual clutch actuators appear to concentrate on the carefully controlled clutch application, but almost ignore the release function. The typical slow release of conventional designs almost guarantees overlap.

The ideal shift control will regulate the torque capacity of both clutches so the sum of both clutches is 100% of engine torque. During shifting, one clutch must transition from 100% engaged to 100% released, at the same time as the other clutch is transitioning from 100% released, to 100% engaged. An overlap will occur if the sum of the torque capacity of both clutches exceeds 100%. A flare will occur if the torque sum of both clutches is less than 100%.

With conventional actuators, shift timing becomes critical to both shift feel and clutch life. Many suggestions have been introduced to improve the shift timing of the dual clutch transmission, since poor shifting is the main driver's complaint about dual clutch transmissions.

In an automatic transmission, the best quality shift transfers power from a one way, or overrunning, clutch (ORC) to another shift element. As the name implies, an ORC locks in one direction, and freewheels in the other direction. If it is designed to lock in the clockwise direction, it will unlock when rotated in the counter clockwise direction. An ORC releases instantly when the direction of rotation of reverses. Since it cannot release until another shift element takes the load, there can be no overlap or flare. Therefore, the ORC eliminates shift timing problems.

Dual clutch transmissions cannot use an ORC because the clutches must be capable of driving in both directions. However, a very fast clutch release mechanism should mimic the instant release of the ORC. With a fast release, shift timing problems should be minimized or eliminated.

The present invention is designed to address or solve at least some of the above described drawbacks and other problems of the dual clutch transmission known in the art, for example, slow clutch release and poor shift timing problems. The present invention provides a new dual clutch transmission with reliable construction and enhanced clutch shift operation. In addition, the dual clutch transmission of the present invention incorporates an effective and space-efficient design with its two clutches arranged in the same direction with its two clutch-actuating devices, and also with its gear shifting device coupled thereto for gear shift operation. Accordingly, the size and volume of the transmission can be reduced compared to a conventional dual clutch transmission.

Moreover, the dual clutch transmission of the present can provide a fast clutch release operation compared to the conventional dual clutch transmission, as is further described below.

Conventional clutches use a diaphragm spring that is similar to a Belleville spring, to transmit force from the thrust bearing to the clutch pressure plate. To release the conventional, normally closed clutch, the thrust bearing applies a load to the diaphragm spring. This thrust is transferred through the clutch assembly to the engine thrust bearings. Since this load is only applied for a short time, it does not damage the engine bearings. The diaphragm spring also acts as a lever to multiply the thrust bearing force by two to three times. However, the diaphragm spring has a large amount of hysteresis. The force and travel at the pressure plate are non-linear as compared to the thrust bearing force. Because of hysteresis, the spring maintains a residual force on the pressure plate, after the thrust bearing has been partially retracted. The spring must travel a considerable distance before all force on the pressure plate is removed. This residual force contributes to overlap, when the clutch is not fully released.

As will be described below in detail, the clutch design of the present invention replaces the diaphragm spring with stiff levers that have no hysteresis. Therefore, the relationship between the thrust bearing travel and the pressure plate travel is linear. When the apply force is removed, the pressure plate force is released instantly.

Moreover, as will also be described below in detail, the clutch design of the present invention utilizes a positive release mechanism unlike the conventional clutch design having only a diaphragm spring for the release operation.

Conventional clutch actuators are designed to transmit force to the thrust bearing in the apply direction only. They rely on the diaphragm spring to retract the thrust bearing and actuator to the fully released position. The conventional design, combined with the diaphragm spring hysteresis could result in uncontrolled operation. This may also explain the difficulty in controlling the clutch overlap, mentioned above.

The clutch actuator system of the present invention is designed to transmit force to the thrust bearing in both directions, apply and release. This design allows a complete control of both the application and release functions.

The clutch actuator of the present invention consists of a small electric motor and planetary gear set to rotate a ball screw. The ball screw nut moves the clutch apply bearing through a lever. The motors contain small brakes to hold position so the motor power may be turned off when the desired thrust bearing load has been achieved. Both actuators operate independently, and are designed to apply or release the driving clutch in milliseconds. The application and release speed can be modulated for throttle conditions. For example, when the vehicle is accelerating rapidly, with a high throttle opening, the engaging clutch will apply quickly. With low throttle openings, the clutch apply is slowed for a smoother shift.

Other special features, characteristics, and improvements of the present invention over the conventional dual clutch transmission system and its actuation devices and dual clutch assembly thereof, will be further described below or otherwise can be recognized from the entire disclosure of this invention by the person skilled in the art.

According to one aspect of the invention, the dual clutch transmission with multiple gears operatively coupled thereto, comprises:

a first input shaft and a second input shaft, the first and second input shafts disposed coaxially to each other and operatively coupled with a plurality of gears and at least one output shaft to drive the transmission with a selected one from the plurality of gears;

a first clutch of generally annular shape, which is operatively coupled with one of the first and second input shafts to drive the transmission with a gear selected from a first set of non-consecutively numbered gears;

a second clutch of generally annular shape, which is disposed coaxially with the first clutch and operatively coupled with the other one of the first and second input shafts to drive the transmission with a gear selected from a second set of non-consecutively numbered gears;

a first clutch actuating device and a second clutch actuating device, each of the first and second clutch actuating devices including an actuator and a pivot member, each pivot member of the first and second clutch actuating devices having a first end operatively coupled to the actuator and a second end operatively coupled to a clutch applicator, each clutch applicator of the first and second clutching actuating devices having a cylindrical shape, each pivot member of the first and second clutching actuating devices configured to pivotally move about a center of pivot to move its clutch applicator for clutch operation; and a plurality of first and second clutch levers received in a clutch retaining housing in a circularly arranged pattern, the first clutch levers operatively coupled between the first clutch and the clutch applicator of the first clutch actuating device, the second clutch levers operatively coupled between the second clutch and the clutch applicator of the second clutch actuating device;

wherein the cylindrically shaped clutch applicator of the first clutch actuating device is disposed coaxially with the cylindrically shaped clutch applicator of the second clutch actuating device, and the first clutch levers and the second clutch levers are alternately arranged in the clutch retaining housing such that the first clutch levers and the second clutch levers can operate independently to each other upon movement of the first clutch applicator or the second clutch applicator to perform a selective clutch operation between the first and second clutches.

In one preferred embodiment, the dual clutch transmission includes six gears plus one reverse gear, and one of the first and second clutches is configured to operate the first, third, and fifth gears, and the other one of the first and second clutches is configured to operate the second, fourth, sixth gears, and the reverse gear.

In another preferred embodiment, the clutch retaining housing includes a first housing member at a first side of the clutch retaining housing, and a second housing member at a second side of the clutch retaining housing, and wherein a majority of components of the second clutch are disposed in the clutch retaining housing near to the first housing member, and a majority of components of the first clutch are disposed in the clutch housing near to the second housing member. The second clutch preferably includes a second clutch application plate of generally annular shape which is coupled with the second clutch levers for the operation of the second clutch, a friction plate arranged next to the second clutch application plate and coupled with a hub of the second clutch, the hub of the second clutch coupled with the second input shaft, and a reaction plate arranged next to the friction plate. The first clutch preferably includes a clutch finger plate of generally annular shape, the clutch finger plate having a plurality of fingers extending in the axial direction of the first clutch and through an outer circumference of the second clutch and configured to push a first clutch application plate of generally annular shape which is coupled with the first clutch levers for clutch application of the first clutch, and a friction plate arranged next to the first clutch application plate and coupled with a hub of the first clutch, the hub of the first clutch coupled with the first input shaft.

In another preferred embodiment, the first and second clutch application plates are coupled with at least one plate spring, respectively, for release operation of the clutches.

According to another aspect of the invention, the clutch actuation apparatus for a dual clutch transmission having first and second clutches coaxially arranged to each other, comprises:

a first clutch actuating device and a second clutch actuating device, each of the first and second clutch actuating devices including an actuator and a pivot member, each pivot member of the first and second clutch actuating devices having a first end operatively coupled to the actuator and a second end operatively coupled to a clutch applicator, each clutch applicator of the first and second clutch actuating devices having a cylindrical shape, the cylindrically shaped clutch applicator of the first clutch actuating device disposed coaxially with the cylindrically shaped clutch applicator of the second clutch actuating device, each pivot member of the first and second clutch actuating devices configured to pivotally move about a pivot to move its clutch applicator for operation of the first and second clutches.

According to another aspect of the invention, the dual clutch apparatus for a dual clutch transmission having first and second input shafts disposed coaxially to each other and operatively coupled with a plurality of gears, comprises:

a first clutch of generally annular shape, which is operatively coupled with one of the first and second input shafts to drive the transmission with a gear selected from a first set of non-consecutively numbered gears;

a second clutch of generally annular shape, which is disposed coaxially with the first clutch and operatively coupled with the other one of the first and second input shafts to drive the transmission with a gear selected from a second set of non-consecutively numbered gears; and a plurality of first and second clutch levers received in a clutch retaining housing in a circularly arranged pattern with the first clutch levers alternately interleaved with the second clutch levers;

wherein the second clutch includes a second clutch application plate of generally annular shape which is coupled with the second clutch levers for operation of the second clutch, a friction plate arranged next to the second clutch application plate and coupled with a hub of the second clutch, the hub of the second clutch coupled with the second input shaft, and a reaction plate arranged next to the friction plate;

wherein the first clutch includes a clutch finger plate of generally annular shape, the clutch finger plate having a plurality of fingers extending in the axial direction of the first clutch and through an outer circumference of the second clutch and configured to push a first clutch application plate of generally annular shape which is coupled with the first clutch levers for clutch application of the first clutch, and a friction plate arranged next to the first clutch application plate and coupled with a hub of the first clutch, the hub of the first clutch coupled with the first input shaft.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which.

DETAILED DESCRIPTION OF THE INVENTION

Preferred or exemplary embodiments of the present invention are described herein with reference to the drawings. Throughout the drawings and associated descriptions of the present application, common or similar elements are to be referred with the same or similar reference characters for simplicity purposes.

Figure 1:
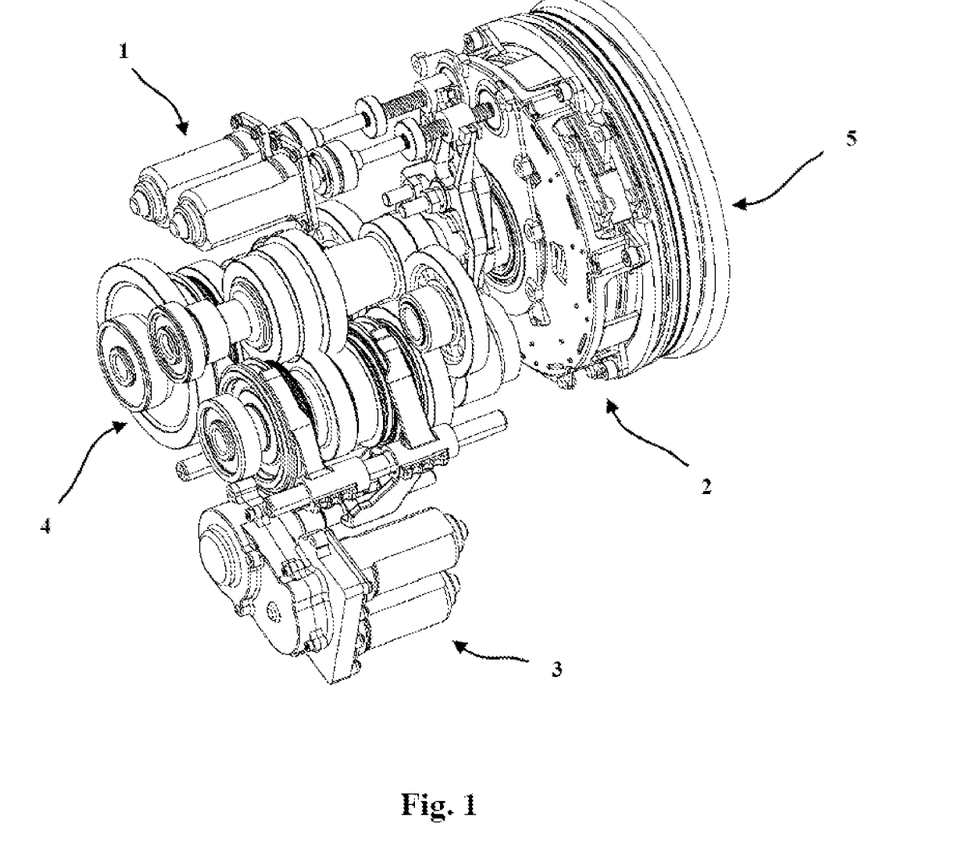
FIG. 1 illustrates, in perspective view, one exemplary embodiment of a dual clutch transmission of the present invention.
Figure 2:
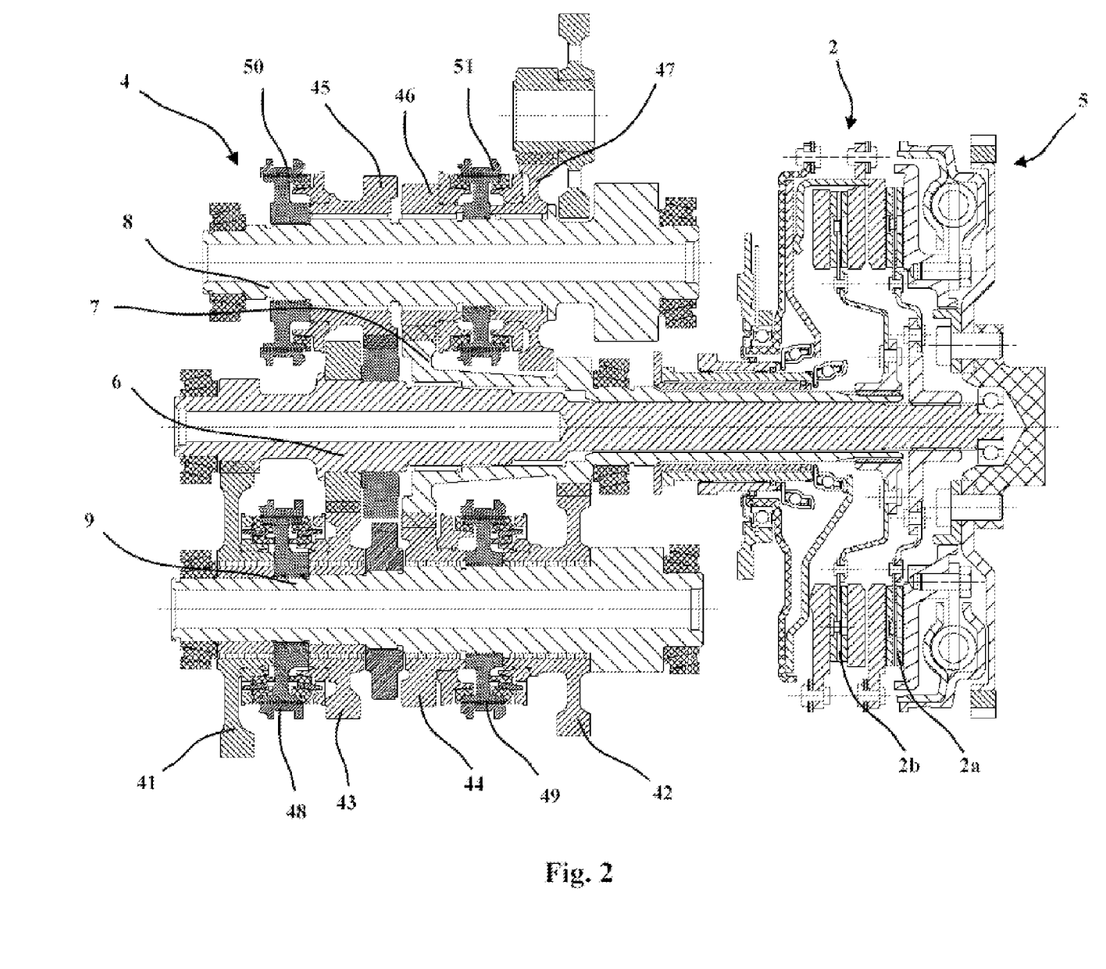
FIG. 2 is a side cross-sectional view of the dual clutch transmission of FIG. 1, illustrating the dual clutch assembly coupled with the input and output shafts and gear trains of the transmission.

FIGS. 1 and 2 illustrate one exemplary embodiment of a dual clutch transmission of the present invention, which is coupled with multiple gears to drive a vehicle with variable gear ratios.

Referring to FIGS. 1 and 2, the dual clutch transmission of the present invention includes a dual clutch actuator assembly 1, and a dual clutch assembly 2 which contains a first clutch ("A clutch") 2a for driving the odd numbered gears (e.g., first gear 41, third gear 43, and fifth gear 45) and a second clutch ("B clutch") 2b for driving the even numbered gears (e.g., second gear 42, fourth gear 44, sixth gear 46) and reverse gear 47 in response to actuation by the dual clutch actuator 1. The transmission includes two input shafts 6 and 7 and two output shafts 8 and 9 that are coupled with a gear train 4 to drive the vehicle in association with the two independent clutches 2a and 2b as will be described below in detail. The transmission may further include a dual mass flywheel 5 to facilitate a stable and non-fluctuating operation of the transmission.

In the embodiment as shown, the dual clutch transmission is designed to accommodate six forward gears and one reverse gear. However, the dual clutch transmission of the present invention is not intended to limit thereto, and can be adapted to incorporate other gear arrangements known in the art, with suitable modifications made to the design for the adaptation. One of ordinary skill in the art can recognize such modifications upon examining the present disclosure. For example, as will be described below, the general structure of the shaft components of the transmission (in particular, the coaxial arrangement of two input shafts 6 and 7 and the parallel arrangement of the output shafts 8 and 9 thereto), and the overall structure of the dual clutch actuator assembly 1 and the dual clutch assembly 2 can be maintained to be the same or similar, however, suitable modifications can be made in the arrangement and structures of the gear train 4 to accommodate the change in the gear arrangements.

In order to perform the gear shifting process, the transmission of the invention further includes a gear shift actuating device 3 to activate the gear selecting and shifting operation to perform the gear shift. One example of the gear shift actuating device that can be coupled with the transmission of the present invention is described in the applicants' co-pending U.S. application Ser. No. 12/761,163 (filed on Apr. 15, 2010), the entire contents of which are incorporated herein by reference. As described in this co-pending application, the gear shift actuating device 3 can include two actuators (i.e., a gear selection actuator and a gear shift actuator) that are preferably arranged in parallel relation with the dual clutch actuator assembly 1 and the dual clutch assembly 2 as shown in FIG. 1. This parallel arrangement of the devices is particularly beneficial because it enables a compact design of the transmission, and thus, resulting in reduction of the size and volume of the transmission. It also enables to provide an effective and reliable construction of the transmission and an effective structure for the gear selection and shift operations as well. Some of these features are well described in the above-identified applicants' co-pending application.

To activate the gear shifting in accordance with operation of the actuator, a plurality of sliding sleeves 48-51 are further provided. In this embodiment, sleeve 48 is for shifting between the first and third gears, sleeve 49 for shifting between the second and fourth gears, sleeve 50 for shifting into the fifth gear, and sleeve 51 for shifting between the sixth and reverse gears.

In order to mimic an automatic transmission with seamless gear shifting, the dual clutch transmission enables a "pre-selection" of one gear among multiple gears by allowing the shifter to engage a non-driven gear while the vehicle is driving with another gear (i.e., driven gear) engaged. For example, when starting the vehicle, the transmission is in first gear (41) with "A" clutch (2a) applied, and "B" clutch (2b) is released. To shift into second gear (42), the shifter pre-selects the second gear (42), which is idle. "A" Clutch (2a) is then released, and "B" clutch (2b) is applied to drive with the second gear (42). The first gear (41) is then disengaged while the transmission is driving in second gear (42). To continue the sequence and shift to third gear (43), the third gear (43) is pre-selected. Then "B" clutch (2b) is released, and "A" clutch (2a) is applied. The second gear (42) is then disengaged. This sequence proceeds automatically and up to the maximum gear step of the vehicle, for example, the sixth gear (46).

With reference to FIGS. 3-7, one preferred embodiment of the dual clutch actuating system, namely, dual clutch actuator assembly 1, and its operating mechanism for the dual clutch transmission are described herein in detail.

Figure 3:
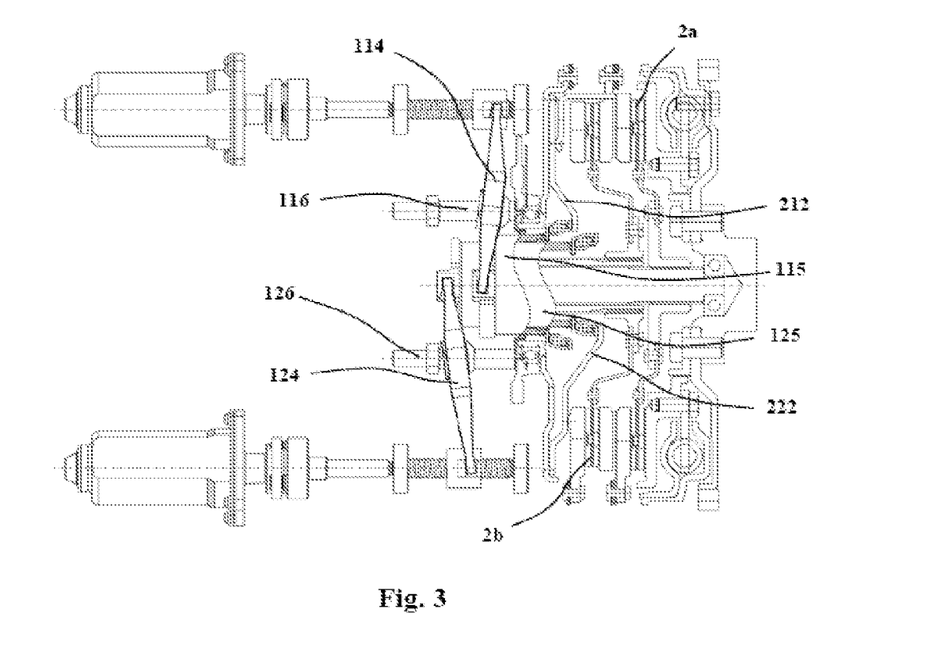
FIG. 3 is a partially cross-sectional, side view of the dual clutch transmission of FIG. 1, illustrating the dual clutch assembly coupled with the dual clutch actuating system of the invention which contains the first and second clutch actuating devices.
Figure 4:
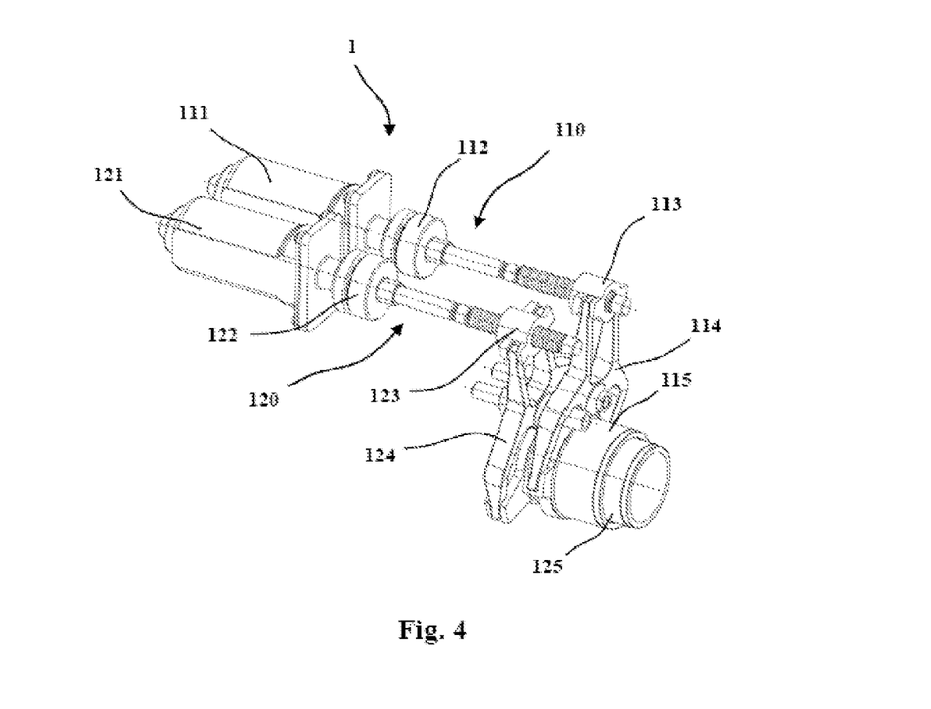
FIG. 4 is a perspective view of the dual clutch actuating system of FIG. 3.
Figure 5:
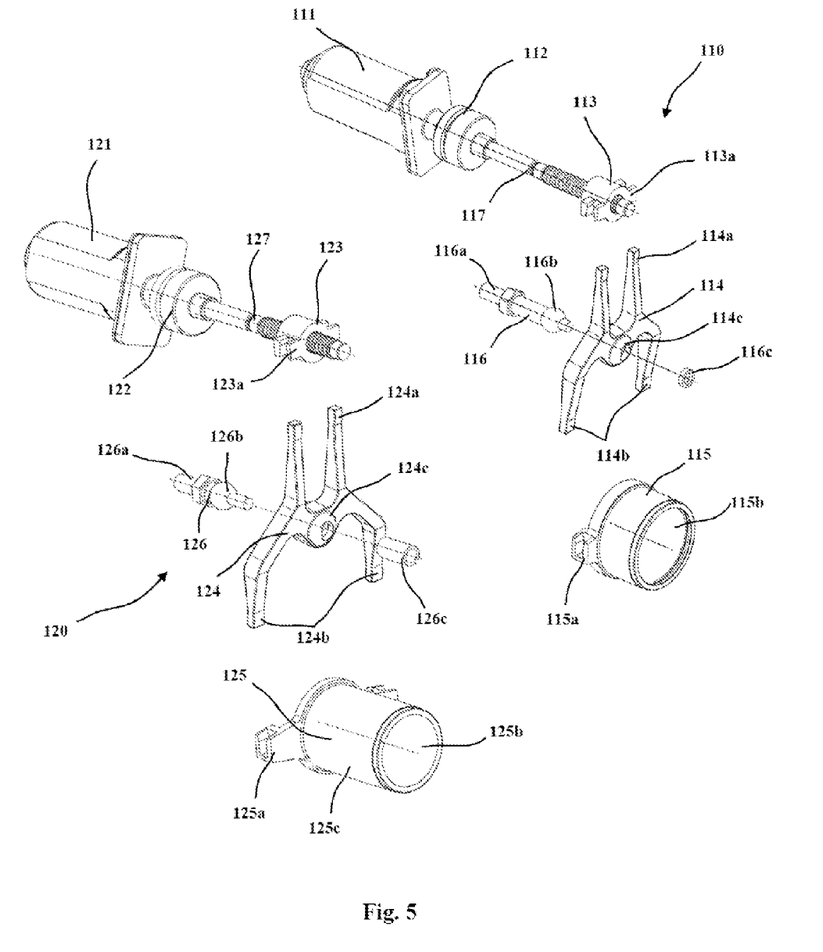
FIG. 5 is a perspective view showing a disassembled state of the dual clutch actuating system of FIG. 4.

Referring to FIGS. 3-5, the dual clutch actuating system 1 consists essentially of a first clutch actuating device 110 for actuating the first clutch ("A" clutch) 2a and a second clutch actuating device 120 for actuating the second clutch ("B" clutch) 2b.

The first clutch actuating device 110 includes actuator 111, such as an electric motor, with its rotating shaft extending in a direction generally parallel with the central axis of the dual clutch assembly 2, a planetary gear 112 coupled to the rotating shaft to rotate the same with suitable speed and power, and a ball screw nut 113 coupled to a distal end of the rotating shaft and configured to feed in the longitudinal direction of the shaft. The first clutch actuating device 110 further includes a pivot member coupled to the ball screw nut 113 to pivotally move about its center of pivot. In the present embodiment as shown, the pivot member is in the form of a pivot fork 114 having its upper end bifurcated into two end portions 114a that are coupled with two opposing side coupling portions 113a of the ball screw nut 113, and its lower end also bifurcated into two end portions 114b that are coupled with two opposing side coupling portions 115a of an axially-movable clutch applicator 115 to activate the clutch operation of the first clutch ("A" clutch) 2a in a manner as described below in detail. In this embodiment, the axially-movable clutch applicator is preferably in the form of a cylindrically-shaped applicator 115 having a central, circular through opening 115b.

The second clutch actuating device 120 includes actuator 121, such as an electric motor, with its rotating shaft extending in a direction generally parallel with the central axis of the dual clutch assembly 2, a planetary gear 122 coupled to the rotating shaft to rotate the same with suitable speed and power, and a ball screw nut 123 coupled to a distal end of the rotating shaft and configured to feed in the longitudinal direction of the shaft. The second clutch actuating device 120 further includes a pivot member coupled to the ball screw nut 123 to pivotally move about its center of pivot. In the present embodiment as shown, the pivot member is in the form of a pivot fork 124 having its upper end bifurcated into two end portions 124a that are coupled with two opposing side coupling portions 123a of the ball screw nut 123, and its lower end also bifurcated into two end portions 124b that are coupled with two opposing side coupling portions 125a of an axially-movable clutch applicator 125 to activate the clutch operation of the second clutch ("B" clutch) 2b in a manner as described below in detail. In this embodiment, the axially-movable clutch applicator is preferably in the form of a cylindrically-shaped applicator 125 having a central, circular through opening 125b and an outer cylindrical surface 125c with a diameter slidably fit in the circular through opening 115b of the cylindrically-shaped applicator 115 of the first clutch actuating device 110.

In order to perform the pivot movements, the first and second clutch actuating devices 110 and 120 further include pivot center members 116 and 126, respectively, each pivot center member having its shaft portion 116a or 126a fixed to a suitable structure of the transmission and its pivoting ball 116b or 126b to be seated in its corresponding inner ball groove portion (not shown) provided in pivot center 114c and 124c of the pivot forks 114 and 124. In order to fix to the transmission (e.g., to the clutch housing), the pivot center members 116 and 126 may include a shaft extension 116c, 126c, each having one end fit to the end of shaft portion 116a or 126a and the other end fit to a side surface of a clutch retaining housing (to be described below) in a manner as shown in FIGS. 3 and 5.

Referring now to FIGS. 8-11, the structure of the dual clutch assembly constructed in accordance with one preferred embodiment of the invention is described herein in detail.

Figure 9:
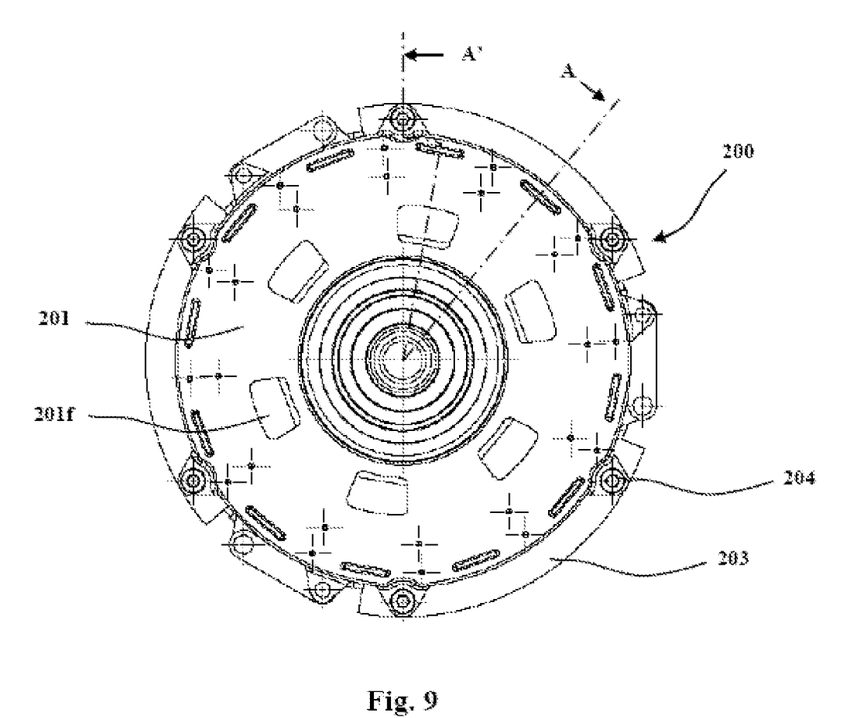
FIG. 9 is a front elevation view of the clutch retaining housing shown from the first clutch housing member side.
Figure 10:
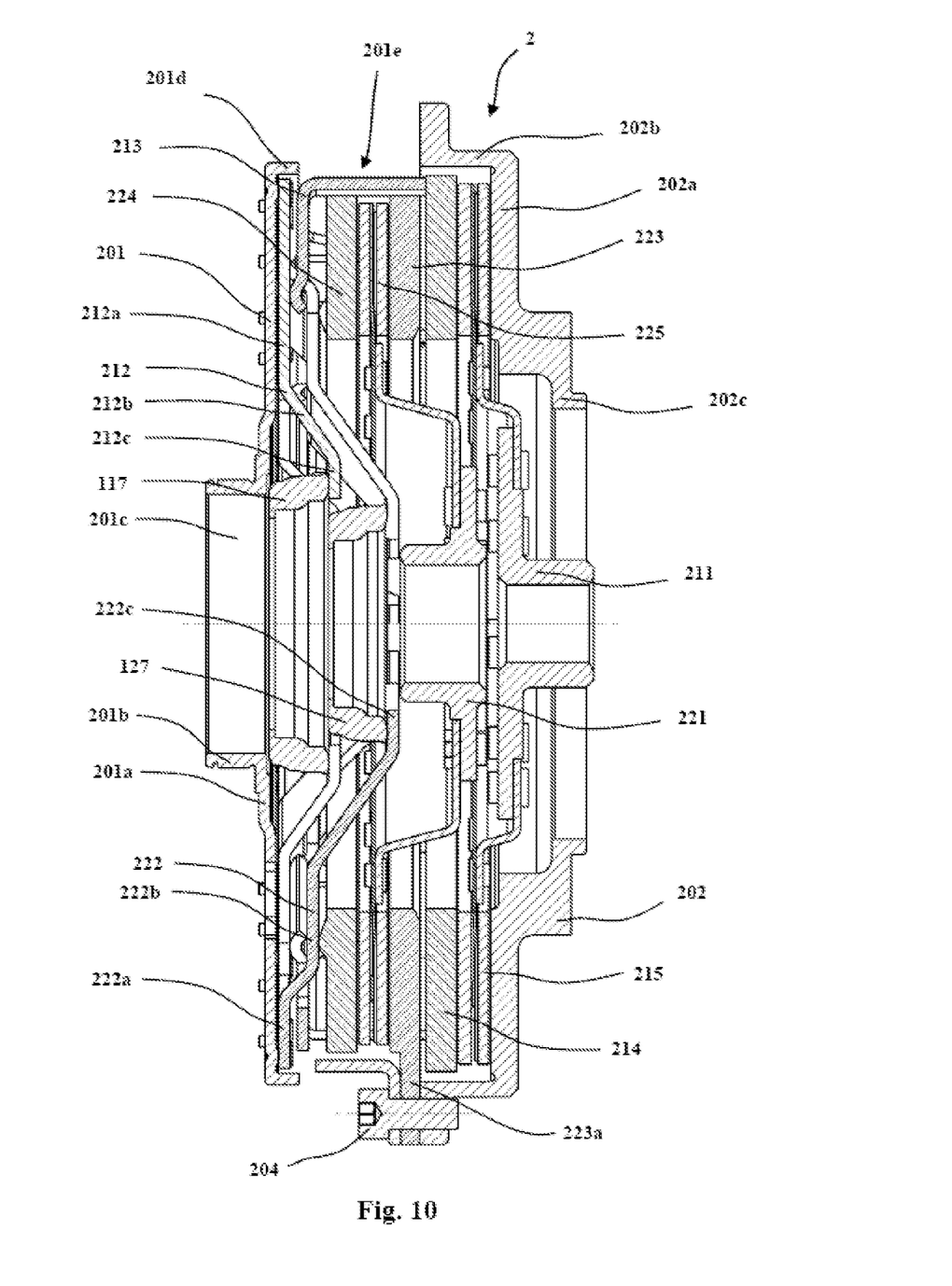
FIG. 10 is a cross-sectional view of the dual clutch assembly, taken from the section A-A' of FIG. 9.

The dual clutch assembly 2 is typically formed into a generally circular housing shape with components for the first and second clutches retained therein. As shown in FIGS. 9 and 10, clutch retaining housing 200 is generally formed with a first housing member 201 forming about one half of the housing and a second housing member 202 forming about the other half of the housing, the two housing parts preferably having circumferential flange portions 203 coupled together by fasteners 204.

Figure 6:
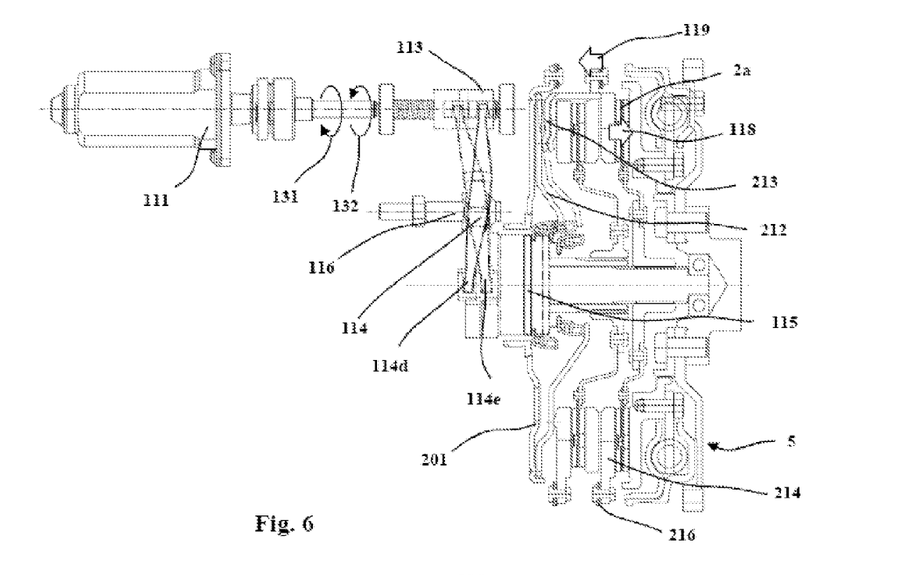
FIG. 6 is a partially cross-sectional, side view of the dual clutch transmission of FIG. 1, which is similar to FIG. 3, however, showing only the first clutch actuating device among the two clutch actuating devices to describe the operation of the first clutch with the first clutch actuating device.

The first housing member 201 includes a face portion 201a of generally flat shape, a rear flange portion 201b with a through hole 201c for receiving the cylindrically-shaped clutch applicator 115 there-through, and a side cylinder portion 201d with a plurality of side openings 201e to facilitate air circulation for cooling the heat generated in the clutches during operation. In order to further facilitate the cooling, the face portion 201a can also include a plurality of front openings 201f as shown in FIG. 9. The second housing member 202 forming about the other half of the housing is formed to have a face portion 202a, a side cylinder portion 202b, and a flange portion 202c with a central opening formed there-through. Unlike the first housing member 201, air circulation openings are not shown in the second housing member 202. However, such openings can optionally be formed in the second housing member 202, in particular, at the side cylinder portion 202b to further facilitate cooling of the clutches. According to one preferred embodiment, the second housing member 202 is connected to the vehicle engine via the flywheel 5 as shown in FIG. 6, and functions as a clutch reaction plate or a clutch drum to transmit the engine torque to the first clutch ("A" clutch) 2a, as will be described below with further details. For this, the face portion 202a of the second housing member 202 preferably has a thickness greater than that of the first clutch housing member 201, and includes a friction surface at the inner surface thereof.

Figure 11:
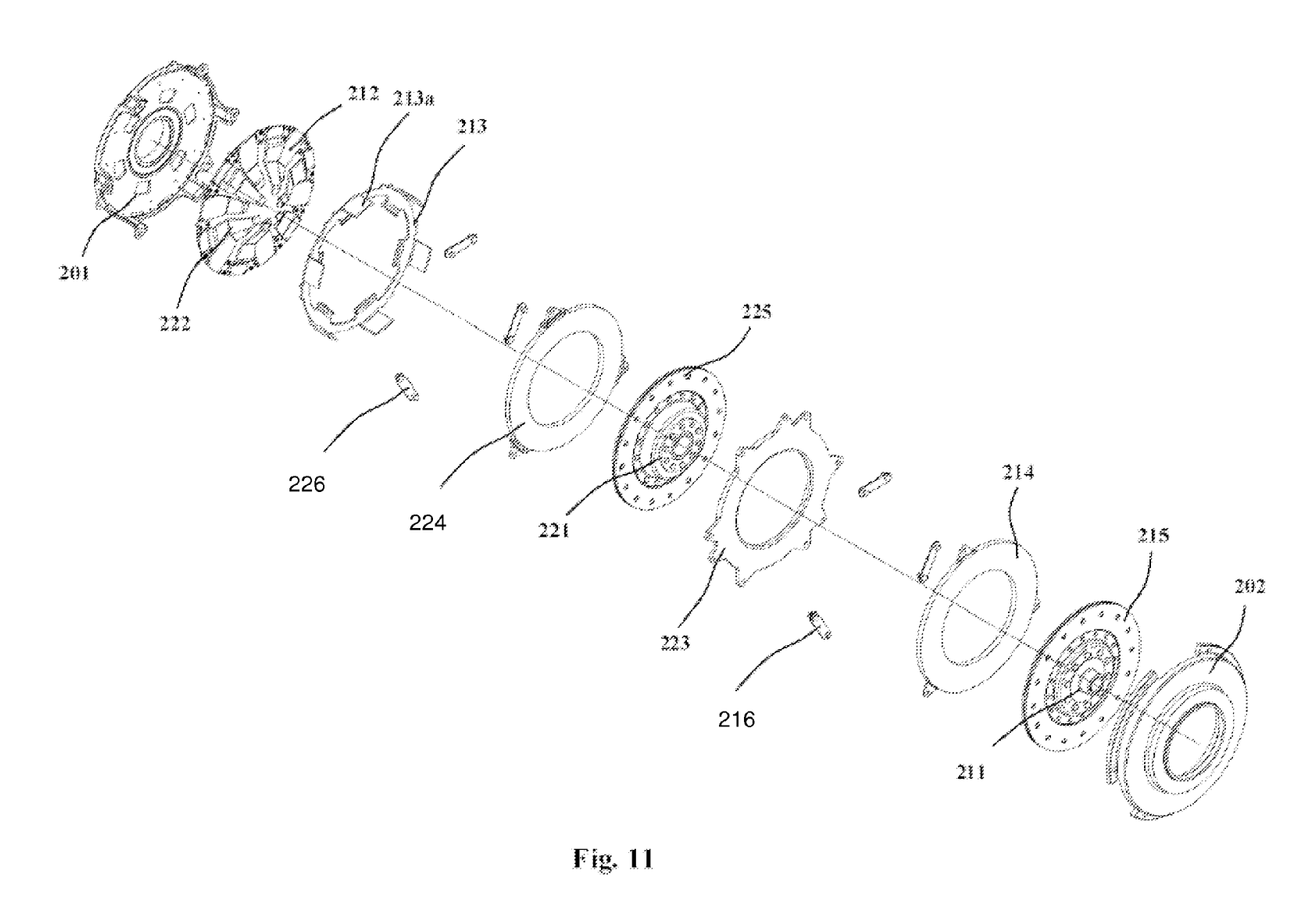
FIG. 11 is a perspective view showing a disassembled state of the dual clutch assembly, with some elements thereof eliminated for illustration purposes.

Referring to FIGS. 10 and 11, the components for the first and second clutches retained in the clutch housing 200 are described herein.

The second clutch (i.e., "B" clutch) 2b includes a plurality of clutch levers 222 (i.e., second clutch levers) arranged in a circular pattern, a clutch application plate 224 of generally annular plate shape, a friction plate 225 of generally annular plate shape, and a reaction plate 223 of generally annular plate shape. As shown at the lower portion of FIG. 10, the reaction plate 223 includes outer flange portion 223a for coupling with the first and second housing members 201 and 202 by fasteners 204. In this manner, the engine torque transferred via the flywheel 5 and the second housing member 202 is transmitted to the reaction plate 223. The friction plate 225 is coupled to a hub 221 which is in turn coupled to the second input shaft 7 (FIG. 2). Thus, if the clutch application plate 224 is pushed by operation of the clutch levers 222, the friction plate 225 disposed between the clutch application plate 224 and the reaction plate 223 can transmit the engine torque to the second input shaft 7, and results in application of the second clutch 2b. In order to effectively transfer the frictional force, the friction plate 225 is preferably formed with two friction plate members of annular plate shape, and with a central flange portion connected to the hub 221.

The second clutch levers 222 each have an outer flange portion 222a, an interim portion 222b of generally angled or stepped shape, and an inner flange portion 222c configured to couple with one end of thrust bearing 127. The clutch levers are designed to have a sufficient strength and rigidity without hysteresis, and thus, they have a fast reaction time in response to the operation of the clutch actuating device 120. As shown in FIGS. 2 and 3, the other end of the thrust bearing 127 is configured to contact with a distal end of the cylindrical clutch applicator 125 to transmit the axial force to be applied by the second clutch actuating device 120. The thrust bearing 127 is preferably coupled with the cylindrical clutch applicator 125 and the second clutch levers 222 using suitable coupling members, for example, such as one or more clips. As the cylindrical clutch applicator 125 and the second clutch levers 222 are coupled together by the thrust bearing 127 and since a diaphragm spring having hysteresis is not required as in the conventional clutch design, the present invention can realize the fast clutch operation both in the application and release directions.

The first clutch (i.e., "A" clutch) 2a includes a plurality of clutch levers 212 (i.e., first clutch levers) arranged in a circular pattern, a clutch application plate 214 of generally annular plate shape, and a friction plate 215 of generally annular plate shape that are positioned near to the second housing member 202 (which functions as a reaction plate or clutch drum). As described above, the second housing member 202 is configured to connect to transmit the engine torque (preferably via the flywheel 5 coupled there-between). The friction plate 215 is coupled to a hub 211 which is in turn coupled to the first input shaft 6 (FIG. 2). Thus, if the clutch application plate 214 is pushed by operation of the first clutch levers 212, the friction plate 215 disposed between the clutch application plate 214 and the second housing member (clutch drum) 202 can transmit the engine torque to the first input shaft 6, and results in application of the first clutch 2a. In order to effectively transfer the frictional force, the friction plate 215 is preferably formed with two friction plate members of annular plate shape, and with a central flange portion connected to the hub 211.

As shown in FIG. 10, a first clutch 2a is disposed next to the second housing 202, and thus, a special consideration is given to the construction of the first clutch 2a. More specifically, a clutch finger plate 213 is provided to transmit the clutch application force from the first clutch levers 212 to the clutch application plate 214. The clutch finger plate 213 has a generally ring-like or annular shape and includes a plurality of fingers 213a extending toward the first clutch application plate 214 and passing through the outer circumference of the second clutch members 224, 225, and 223 to push the first clutch application plate 214, without interference with the second clutch, to apply the first clutch 2a.

The first clutch levers 212 each include an outer flange portion 212a, an interim portion 212b, and an inner flange portion 212c configured to couple with one end of thrust bearing 117. The clutch levers are designed to have a sufficient strength and rigidity without hysteresis, and thus, they have a fast reaction time in response to the operation of the clutch actuating device 110. As shown in FIG. 11, the first clutch levers 212 and the second clutch levers 222 (for the second clutch) are disposed in alternately interleaved pattern.

As shown in FIGS. 2 and 3, the other end of the thrust bearing 117 is configured to contact with a distal end of the cylindrical clutch applicator 115 to transmit the axial force to be applied by the first clutch actuating device 110. The thrust bearing 117 is preferably coupled with the cylindrical clutch applicator 115 and the first clutch levers 212 with suitable coupling members, for example, such as one or more clips. As the cylindrical clutch applicator 115 and the first clutch levers 212 are coupled together by the thrust bearing 117 and also since a diaphragm spring having hysteresis is not required as in the conventional clutch design, the present invention can realize the fast clutch operation both in the application and release directions.

Figure 7:
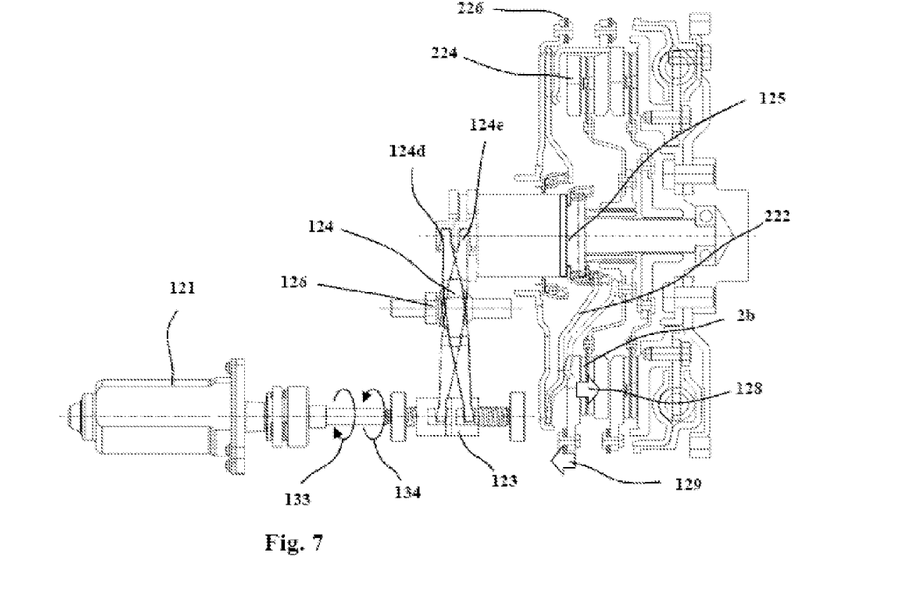
FIG. 7 is a partially cross-sectional, side view of the dual clutch transmission of FIG. 1, which is similar to FIG. 3, however, showing only the second clutch actuating device among the two clutch actuating devices to describe the operation of the second clutch with the second clutch actuating device.
Figure 8:
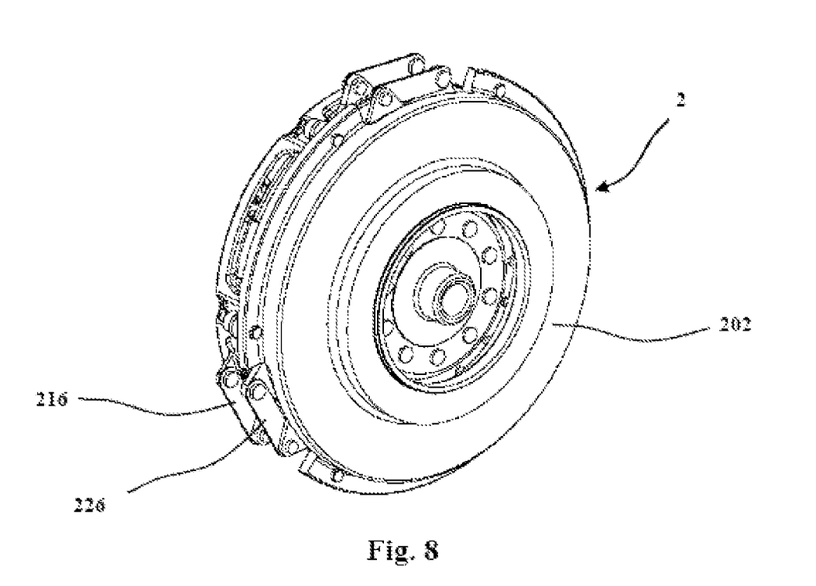
FIG. 8 is a perspective view illustrating the clutch retaining housing with the dual clutch components installed therein, which is shown from the second clutch housing member side.

In addition, as shown in FIGS. 6 and 7, the first clutch 2a further includes three drive springs 216 coupled to the clutch application plate 214 to facilitate the clutch release operation of the first clutch 2a, and similarly, the second clutch 2b includes three drive springs 226 coupled to the clutch application plate 224 to facilitate the clutch release operation of the second clutch 2b. The drive springs 216 and 226 of the first and second clutches are preferably in the form of plate pressure springs having a sufficient spring force and a fast reaction time, and thus, a fast release operation of the first and second clutches 2a and 2b can be realized.

Referring to FIGS. 6 and 10, the operation of the first clutch actuating device 110 to apply and release the first clutch 2a is described in further detail.

In order to apply or engage the first clutch 2a, the actuator 111 (e.g., an electric motor) of the first clutch actuation device 110 is rotated in a direction 132 (for example, a counterclockwise direction) in response to an operation signal of a controller (not shown), and its causes the ball screw nut 113 coupled at the distal end of the actuator shaft to retract toward the actuator 111. As a result, the pivot member (e.g., pivot fork 114) rotates about its pivot center and moves from a neutral position 114d (shown in solid lines) to a clutch engagement position 114e (shown in dotted lines). This in turn causes the cylindrically-shaped clutch applicator 115 to move toward the clutch, and then, the first clutch levers 212 and the clutch finger plate 213 to respectively proceed toward the clutch (as shown in dotted lines). Accordingly, the first clutch 2a is engaged in a manner described above in connection with FIGS. 8-11.

In order to release the first clutch 2a, the actuator 111 of the first clutch actuation device 110 is rotated in a direction 131 (for example, a clockwise direction) in response to the operation signal of the controller (not shown), and its causes the ball screw nut 113 coupled at the distal end of the actuator shaft to proceed toward the clutch. As a result, the pivot member (e.g., pivot fork 116) rotates about its pivot center and moves from the clutch engagement position 114e (shown in dotted lines) to the neutral or release position 114d (shown in solid lines). This in turn causes the cylindrically-shaped clutch applicator 115 and the clutch levers 212 (which are coupled with the cylindrically-shaped clutch applicator 115 by the thrust bearing 117) to move in a retraction direction from the clutch, and positively eliminates the axial force to the clutch levers 212 very quickly. Then, the plate drive spring 216 applies a strong retraction spring force to quickly move the clutch application plate 214 in the retraction direction 119, which results in releasing the first clutch 2a very quickly and faster than the conventional clutches.

Referring now to FIGS. 7 and 10, the operation of the second clutch actuating device 120 to apply and release the second clutch 2b is described in further detail.

In order to apply or engage the second clutch 2b, the actuator 121 (e.g., an electric motor) of the second clutch actuation device 120 is rotated in a direction 134 (for example, a counterclockwise direction) in response to an operation signal of a controller (not shown), and its causes the ball screw 123 coupled at the distal end of the actuator shaft to retract toward the actuator 121. As a result, the pivot member (e.g., pivot fork 126) rotates about its pivot center and moves from a neutral position 124d (shown in solid lines) to a clutch engagement position 124e (shown in dotted lines). This in turn causes the cylindrically-shaped clutch applicator 125 to move toward the clutch, and then, the second clutch levers 222 to proceed toward the clutch (as shown in dotted lines). Accordingly, the second clutch 2b is engaged in a manner described above in connection with FIGS. 8-11.

In order to release the second clutch 2b, the actuator 121 of the second clutch actuation device 120 is rotated in a direction 133 (for example, a clockwise direction) in response to the operation signal of the controller (not shown), and its causes the ball screw 123 coupled at the distal end of the actuator shaft to proceed toward the clutch. As a result, the pivot member (e.g., pivot fork 124) rotates about its pivot center and moves from the clutch engagement position 124e (shown in dotted lines) to the neutral or release position 124d (shown in solid lines). This in turn causes the cylindrically-shaped clutch applicator 125 and the clutch levers 222 (which are coupled with the cylindrically-shaped clutch applicator 125 by the thrust bearing 127) to move in the retraction direction from the clutch, and positively eliminates the axial force to the clutch levers 222 very quickly. Then, the plate drive spring 226 applies a strong spring force to move the clutch application plate 224 in the retraction direction 129, which results in releasing the second clutch 2b very quickly and faster than the conventional clutches.

As detailed above, the dual clutch transmission, the dual clutch assembly for the dual clutch transmission, and actuation devices thereof, and methods for operating the dual clutch transmission are illustrated and described in association with several exemplary or currently preferred embodiments thereof. The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A dual clutch apparatus for a dual clutch transmission having a first input shaft and a second input shaft, the first and second input shafts disposed coaxially to each other and operatively coupled with a plurality of gears and at least one output shaft to drive the transmission with a selected one from the plurality of gears, the dual clutch apparatus comprising:

a first clutch of generally annular shape, which is operatively coupled with one of the first and second input shafts to drive the transmission with a gear selected from a first set of non-consecutively numbered gears;

a second clutch of generally annular shape, which is disposed coaxially with the first clutch and operatively coupled with the other one of the first and second input shafts to drive the transmission with a gear selected from a second set of non-consecutively numbered gears; and a plurality of first clutch levers and a plurality of second clutch levers received in a clutch retaining housing in a circularly arranged pattern with the first clutch levers alternately interleaved with the second clutch levers, each of the first clutch levers and the second clutch levers having an outer flange portion, an interim portion extending from the outer flange portion and having a generally angled or stepped shape, and an inner flange portion extending from the interim portion, each of said outer flange portions of the first and second clutch levers abutting against an inner wall surface of the clutch retaining housing;

wherein the second clutch includes a second clutch application plate of generally annular shape which is coupled with the second clutch levers for clutch operation of the second clutch, a friction plate arranged next to the second clutch application plate and coupled with a hub of the second clutch, the hub of the second clutch coupled with the second input shaft, and a reaction plate arranged next to the friction plate;

wherein the first clutch includes a clutch finger plate of generally annular shape, the clutch finger plate having a plurality of fingers extending in the axial direction of the first clutch and through an outer circumference of the second clutch, and the clutch finger plate being moveable in the axial direction of the first clutch to push a first clutch application plate of generally annular shape which is coupled with the first clutch levers for clutch application of the first clutch, and a friction plate arranged next to the first clutch application plate and coupled with a hub of the first clutch, the hub of the first clutch coupled with the first input shaft.

2. The dual clutch apparatus as claimed in claim 1, wherein the clutch retaining housing includes a first housing member at a first side of the clutch retaining housing, and a second housing member at a second side of the clutch retaining housing, wherein the second clutch levers, the second clutch application plate, the friction plate, and the reaction plate of the second clutch are sequentially disposed in the clutch retaining housing near to the first housing member, and wherein the first clutch levers and the clutch finger plate of the first clutch are sequentially disposed in the clutch housing near to the first housing member, and the first clutch application plate and the friction plate of the first clutch are sequentially disposed in the clutch housing near to the second housing member.

3. The dual clutch apparatus as claimed in claim 1, further comprising:
 a first thrust bearing coupled to the inner flange portions of the first clutch levers; and
 a second thrust bearing coupled to the inner flange portions of the second clutch levers,
 wherein the first thrust bearing is coaxially disposed with the second thrust bearing.

4. The dual clutch apparatus as claimed in claim 3, wherein the first thrust bearing is coupled to a first cylindrical clutch applicator, and the second thrust bearing is coupled to a second cylindrical clutch applicator that is coaxially disposed with the first cylindrical clutch applicator.

* * * * *